This invention relates to a novel composition of matter and a method for making and using the novel material. More particularly the invention relates to a novel molecular sieve of the zeolite family.

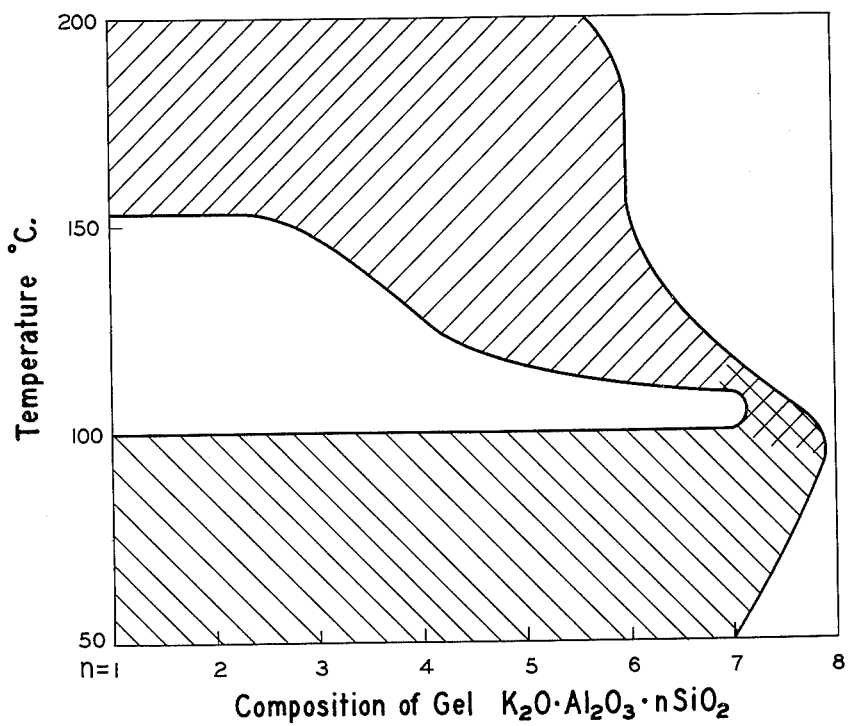
Conditions For Preparation of Zeolite K-G
INVENTORS
RICHARD M. BARRER
JOHN W. BAYNHAM 3,056,654
PROCESS FOR MAKING CRYSTALLINE
ZEOLITE K-G
Richard Maling Barrer, Bromley, England, and John William Baynham, Coupar, Fife, Scotland, assignors to Union Carbide Corporation, a corporation of New York
Filed Feb. 29, 1956, Ser. No. 568,653
3 Claims. (Cl. 23—113)

Zeolites are metal-aluminum-silicates and many are found in nature. A number of these materials are known to be useful as ion-exchange agents and as adsorbents. The crystalline structure of some zeolites, called molecular sieves, is such that a relative large space exists within the crystal. Adsorbate molecules are retained in these spaces. Access to the spaces is by way of openings in the crystal lattice. These openings limit the size of the molecules that can be adsorbed by the molecular sieves and permit a separation of certain mixtures of molecules on the basis of the size of molecules in the mixture. Other preferences for adsorbates are exhibited by the molecular sieves based on, for example, the polarity of the adsorbate and the degree of unsaturation of organic adsorbates.

A number of the zeolitic molecular sieves have been synthesized. These molecular sieves are distinguishable from each other on the basis of either their composition, crystalline structure, adsorptive properties or a combination of these characteristics. The existence of a number of molecular sieves having similar but distinguishable properties permits the selection of an adsorbent having the optimum properties for any given adsorption process.

It is the principal object of this invention to provide a useful zeolitic molecular sieve and a process for making such a material.

The zeolite of the invention has been designated zeolite K-G to distinguish it from other zeolites. A general formula for zeolite K-G expressed in terms of mol ratios of oxides is as follows:

$$0.9\text{--}1.1 M_{2/n}O : Al_2O_3 : 2.3\text{--}4.2 SiO_2 : 2.6\text{--}4.6 H_2O$$

In the formula "M" represents an exchangeable cation and "$n$" its valence. The potassium form of zeolite K-G has a formula as follows:

$$0.9\text{--}1.1 K_2O : Al_2O_3 : 2.3\text{--}4.2 SiO_2 : 2.6\text{--}4.6 H_2O$$

The water in zeolite K-G may be removed by heating the zeolite. After at least part of the water has been removed, as by heating, zeolite K-G is an effective adsorbent for water and other molecules.

The preparation of zeolite K-G is accomplished by crystallizing gels of the proper composition at the proper temperature in the presence of potassium hydroxide. Example I illustrates the manner in which zeolite K-G is prepared.

EXAMPLE I

A gel was formed by mixing potassium hydroxide, silicic acid (containing 15% by weight silica), and aluminum hydroxide in water. The gel had a composition of

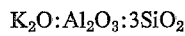

$$K_2O : Al_2O_3 : 3SiO_2$$

A portion of the dried gel corresponding to 0.5 gram by weight of the constituents and 15 milliliters of potassium hydroxide solution (150 mol percent excess of potassium hydroxide) were mixed to form a gel having a composition of $2.5K_2O : Al_2O_3 : 3SiO_2$. This gel was sealed in a 20 milliliter autoclave and heated at 150° C. for about 3 days.

The crystalline product was filtered, washed and dried. Chemical analysis of the product showed its composition to be $0.92K_2O : Al_2O_3 : 2.3SiO_2 : 3.4H_2O$.

The product obtained in Example I had an X-ray diffraction pattern as shown in Table A.

Table A

| Intensity | $d$ (A.) obs. | Intensity | $d$ (A.) obs. |
|---|---|---|---|
| medium strong | 9.47 | weak | 1.90 |
| medium | 6.90 | medium | 1.84 |
| Do | 5.22 | very weak | 1.75 |
| strong | 4.32 | strong | 1.71 |
| medium strong | 3.97 | medium | 1.63 |
| weak | 3.70 | medium strong | 1.57 |
| Do | 3.46 | weak | 1.48 |
| medium weak | 3.11 | Do | 1.45 |
| very, very strong | 2.93 | Do | 1.44 |
| weak | 2.80 | medium strong | 1.32 |
| strong | 2.59 | weak | 1.30 |
| Do | 2.29 | medium | 1.28 |
| medium strong | 2.19 | Do | 1.23 |
| medium | 2.09 | | |

The X-ray diffraction pattern of zeolite K-G corresponds to the rhombohedral crystal system with a unit cell edge, $a$, equal to 9.52 A.

In the drawing the conditions under which zeolite K-G may be prepared are shown. The shaded area represents the combination of gel compositions and holding temperatures that can be used to make zeolite K-G. A gel having a composition corresponding to one in the drawing is held in the presence of potassium hydroxide at an appropriate temperature, as determined from the drawing, until crystals of zeolite K-G are formed. At temperatures below 100° C. crystals of zeolite K-G mixed with other materials are obtained. At temperaures above 100° C. and particularly at temperatures above about 160° C. good yields of relatively pure zeolite K-G are obtained with gels having a molar ratio of silica to either $K_2O$ or $Al_2O_3$ of between 1 and about 6.

Zeolite K-G which is at least partially dehydrated is a good adsorbent for small polar compounds such as water, carbon dioxide, and ammonia at about 25° C. This property makes zeolite K-G a suitable material for adsorbing small polar molecules and removing such molecules from mixtures of such molecules and others.

The potassium form of zeolite K-G, made as described above, can be converted to other forms in aqueous solutions containing an exchangeable cation. Lithium, sodium, ammonium, rubidium, cesium and calcium ions have been exchanged for the potassium in potassium zeolite K-G to give the corresponding form of zeolite K-G.

What is claimed is:

1. A process for making zeolite K-G which process comprises holding a gel in the presence of at least about 150% molar excess of potassium hydroxide at a predetermined temperature, said gel having a composition falling in the shaded area of the figure of the drawing, said temperature being one corresponding to said composition in said figure of said drawing, and continuing to hold said gel at said temperature until crystals of said zeolite K-G are formed, said crystals having the composition

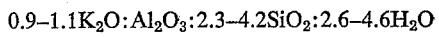

$$0.9\text{--}1.1 K_2O : Al_2O_3 : 2.3\text{--}4.2 SiO_2 : 2.6\text{--}4.6 H_2O$$

and having an X-ray diffraction pattern as shown in Table A.

2. A process for producing zeolite K-G which comprises (1) forming a gel from an aqueous potassium aluminosilicate reactant mixture whose composition expressed in terms of oxide mol ratios is about as follows:

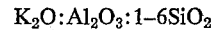

$$K_2O : Al_2O_3 : 1\text{--}6SiO_2$$

and (2) maintaining said gel at a temperature between about 160° C. and 200° C. in the presence of at least about 150% molar excess of potassium hydroxide until crystals are formed which have the composition:

$$0.9-1.1K_2O:Al_2O_3:2.3-4.2SiO_2:2.6-4.6H_2O$$

and which have an X-ray diffraction pattern as shown in Table A.

3. A process for producing zeolite K-G which comprises (1) forming a gel from an aqueous potassium aluminosilicate reactant mixture whose composition expressed in terms of oxide mol ratios is about as follows:

$$K_2O:Al_2O_3:3SiO_2$$

(2) maintaining said gel at a temperature of about 150° C. in the presence of about 150% molar excess of potassium hydroxide until crystals are formed which have the composition:

$$0.9-1.1K_2O:Al_2O_3:2.3-4.2SiO_2:2.6-4.6H_2O$$

and which have an X-ray diffraction pattern as shown in Table A.

References Cited in the file of this patent

UNITED STATES PATENTS

| | | |
|---|---|---|
| 1,636,942 | Prather | July 26, 1927 |
| 1,945,838 | Vaughan | Feb. 6, 1934 |
| 1,961,902 | McElroy | June 5, 1934 |
| 2,004,257 | Tschirner | June 11, 1935 |
| 2,283,172 | Bates | May 19, 1942 |
| 2,617,712 | Bond | Nov. 11, 1952 |
| 2,882,244 | Milton | Apr. 14, 1959 |

OTHER REFERENCES

Mellor: Treatise on Inorganic and Theoretical Chemistry, vol. 6, pp. 567, 568, 571, 574 and 575, Longmans, Green and Co., New York, 1925.

Barrer et al.: "J. Chem. Soc.," pp. 1561–71, 1952.

Barrer et al.: "J. Chem. Soc.," Part 3, pp. 2882–2891 (1956).